(12) United States Patent
Gyoda et al.

(10) Patent No.: US 11,662,560 B2
(45) Date of Patent: May 30, 2023

(54) ZOOM LENS AND IMAGE PICKUP APPARATUS

(71) Applicant: CANON KABUSHIKI KAISHA, Tokyo (JP)

(72) Inventors: Yuichi Gyoda, Tochigi (JP); Hiroki Ebe, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 122 days.

(21) Appl. No.: 17/215,819

(22) Filed: Mar. 29, 2021

(65) Prior Publication Data

US 2021/0311290 A1    Oct. 7, 2021

(30) Foreign Application Priority Data

Apr. 3, 2020  (JP) .............................. JP2020-067831

(51) Int. Cl.
*G02B 15/14* (2006.01)
*G02B 13/02* (2006.01)

(52) U.S. Cl.
CPC ...... *G02B 15/144511* (2019.08); *G02B 13/02* (2013.01)

(58) Field of Classification Search
CPC ............ G02B 15/144511; G02B 13/02; G02B 15/143507; G02B 1/00; G02B 1/041; G02B 15/1435; G02B 15/143503; G02B 15/177
See application file for complete search history.

(56) References Cited

U.S. PATENT DOCUMENTS

| | | | |
|---|---|---|---|
| 9,897,788 | B2 | 2/2018 | Gyoda |
| 9,995,925 | B2 | 6/2018 | Ebe |
| 10,025,075 | B2 | 7/2018 | Gyoda |
| 10,120,172 | B2 | 11/2018 | Gyoda |
| 10,215,972 | B2 | 2/2019 | Gyoda et al. |
| 10,935,705 | B2 | 3/2021 | Ebe |
| 2019/0094490 | A1 | 3/2019 | Gyoda |
| 2019/0302430 | A1 | 10/2019 | Ebe |
| 2020/0110251 | A1 | 4/2020 | Gyoda |
| 2020/0257181 | A1 | 8/2020 | Gyoda |

(Continued)

FOREIGN PATENT DOCUMENTS

| | | |
|---|---|---|
| CN | 101726842 A | 6/2010 |
| CN | 102331619 A | 1/2012 |
| CN | 105652423 A | 6/2016 |

(Continued)

OTHER PUBLICATIONS

Notification of the First Office Action issued by the China National Intellectual Property Administration on Dec. 2, 2022 in corresponding CN Patent Application No. 202110348078.2, with English translation.

*Primary Examiner* — Alicia M Harrington
(74) *Attorney, Agent, or Firm* — Carter, DeLuca & Farrell LLP

(57) ABSTRACT

A zoom lens includes, in order from an object side to an image side, a first lens unit having a negative refractive power, a second lens unit having a positive refractive power, and a rear unit including one or more lens units. Distances between adjacent lens units change during zooming. The first lens unit includes a negative lens made of resin. The rear unit includes a positive lens made of resin. A predetermined condition is satisfied.

17 Claims, 11 Drawing Sheets

(56) References Cited

U.S. PATENT DOCUMENTS

2021/0149165 A1    5/2021   Saito et al.

FOREIGN PATENT DOCUMENTS

| JP | H0961711 A   | * | 3/1997 |
| JP | 2011017990 A | * | 1/2011 |
| JP | 2014-178388 A |  | 9/2014 |
| JP | 2018040948 A | * | 3/2018 |

* cited by examiner

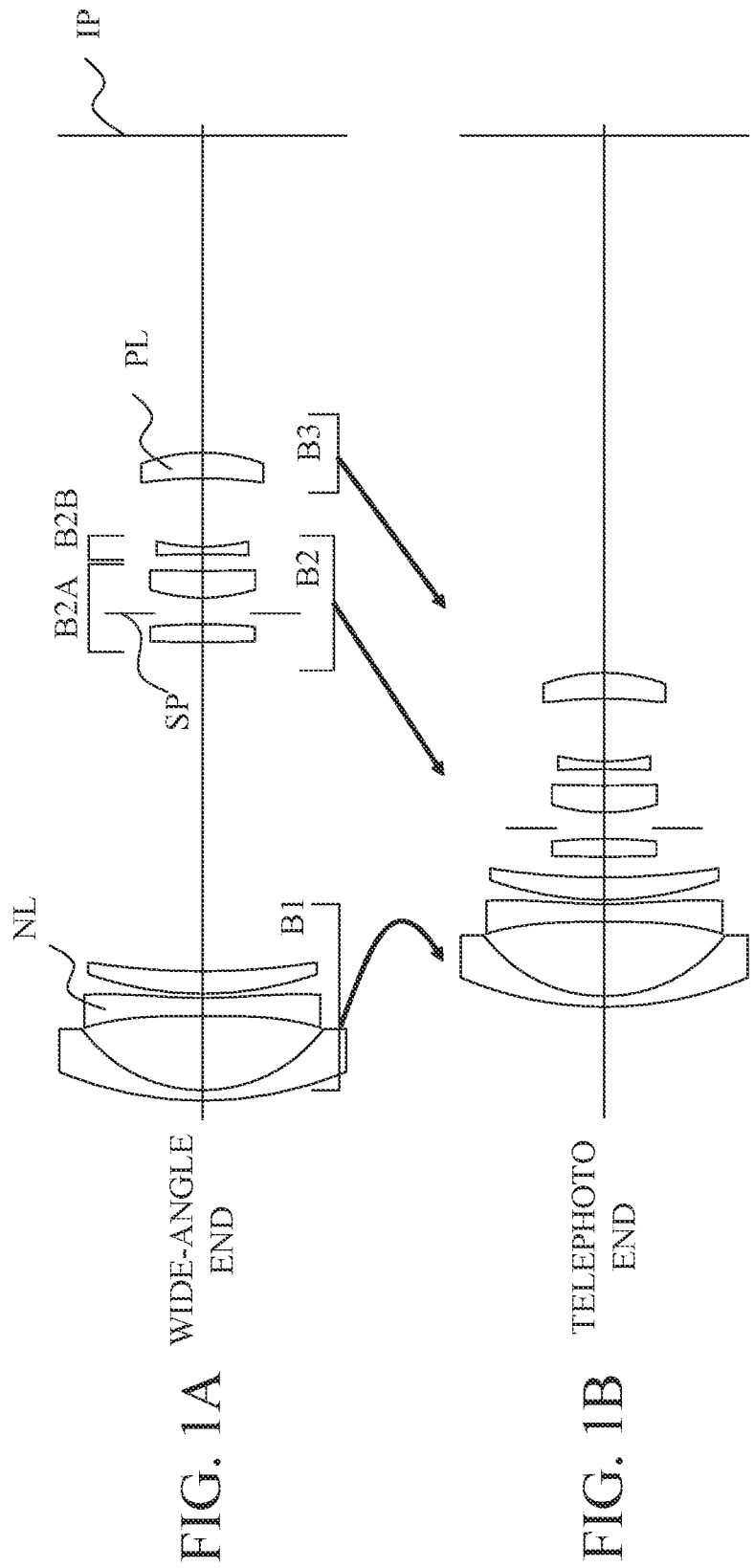

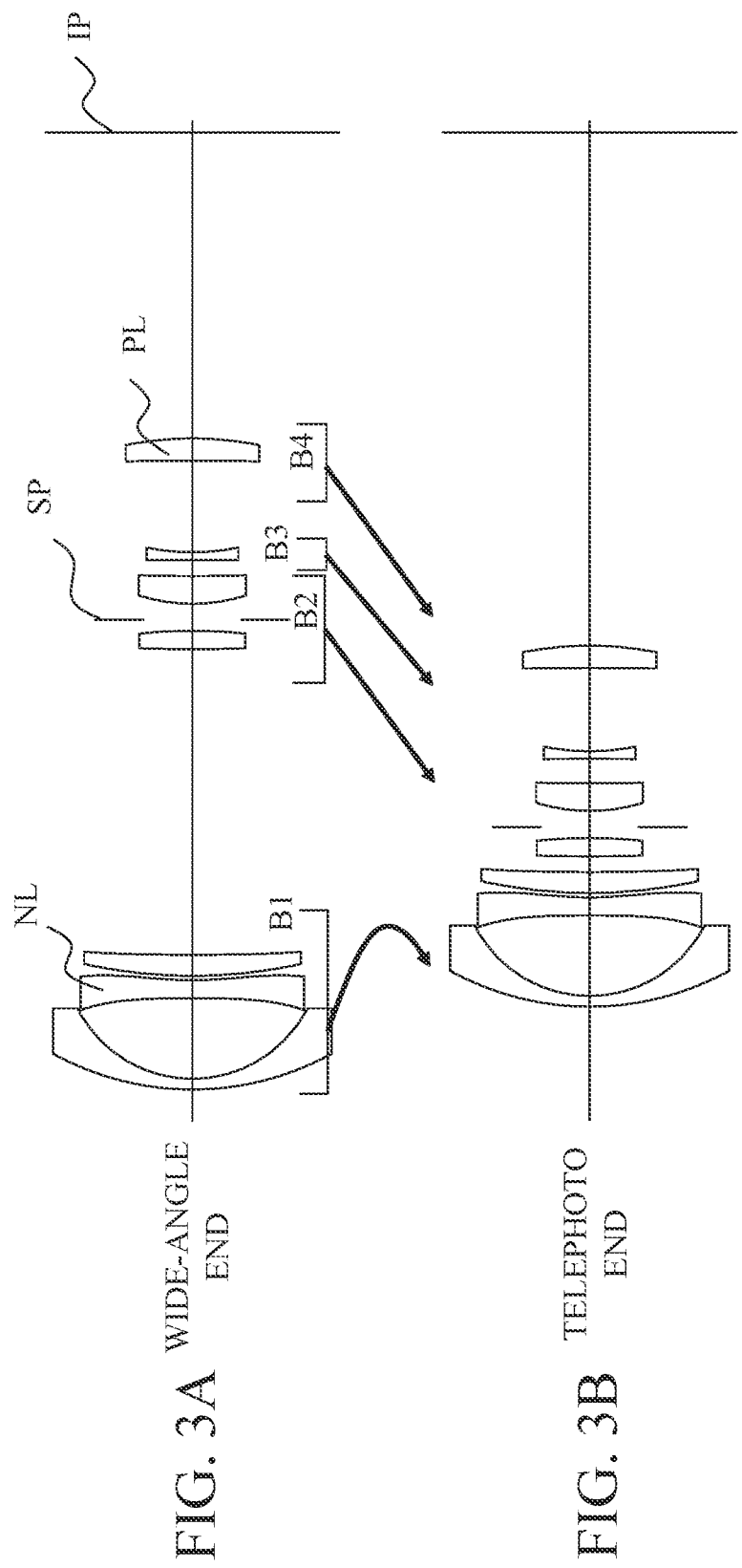

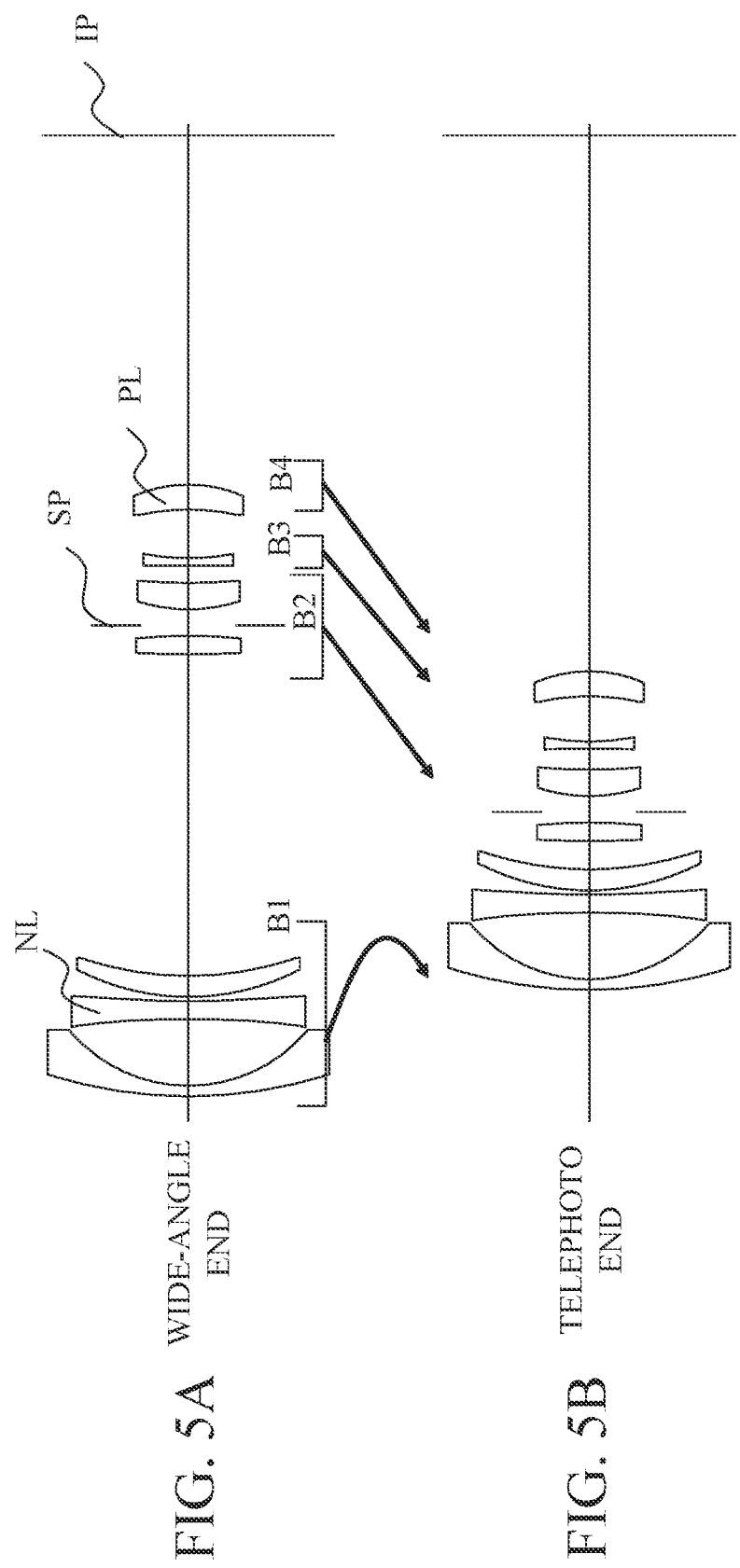

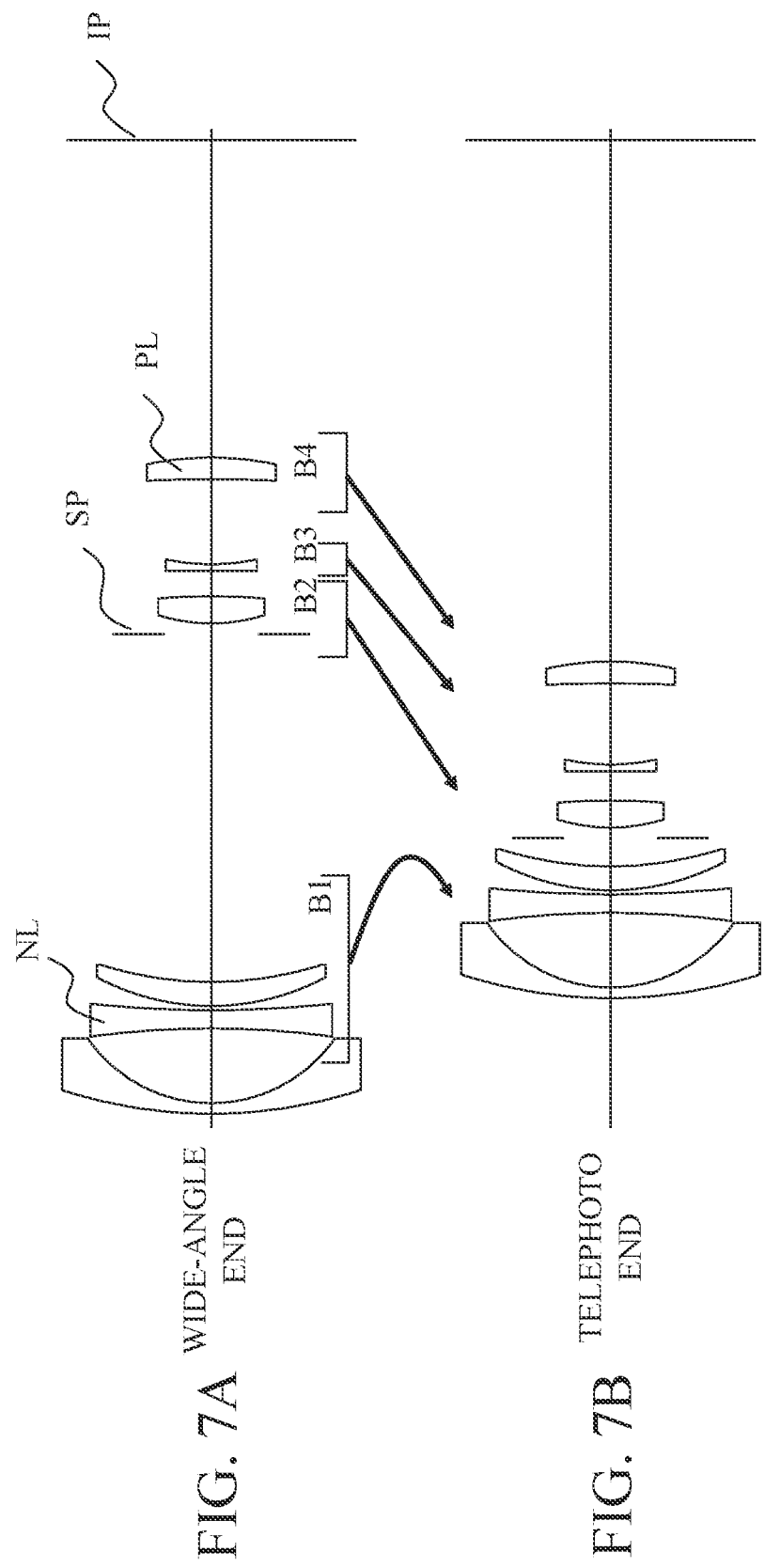

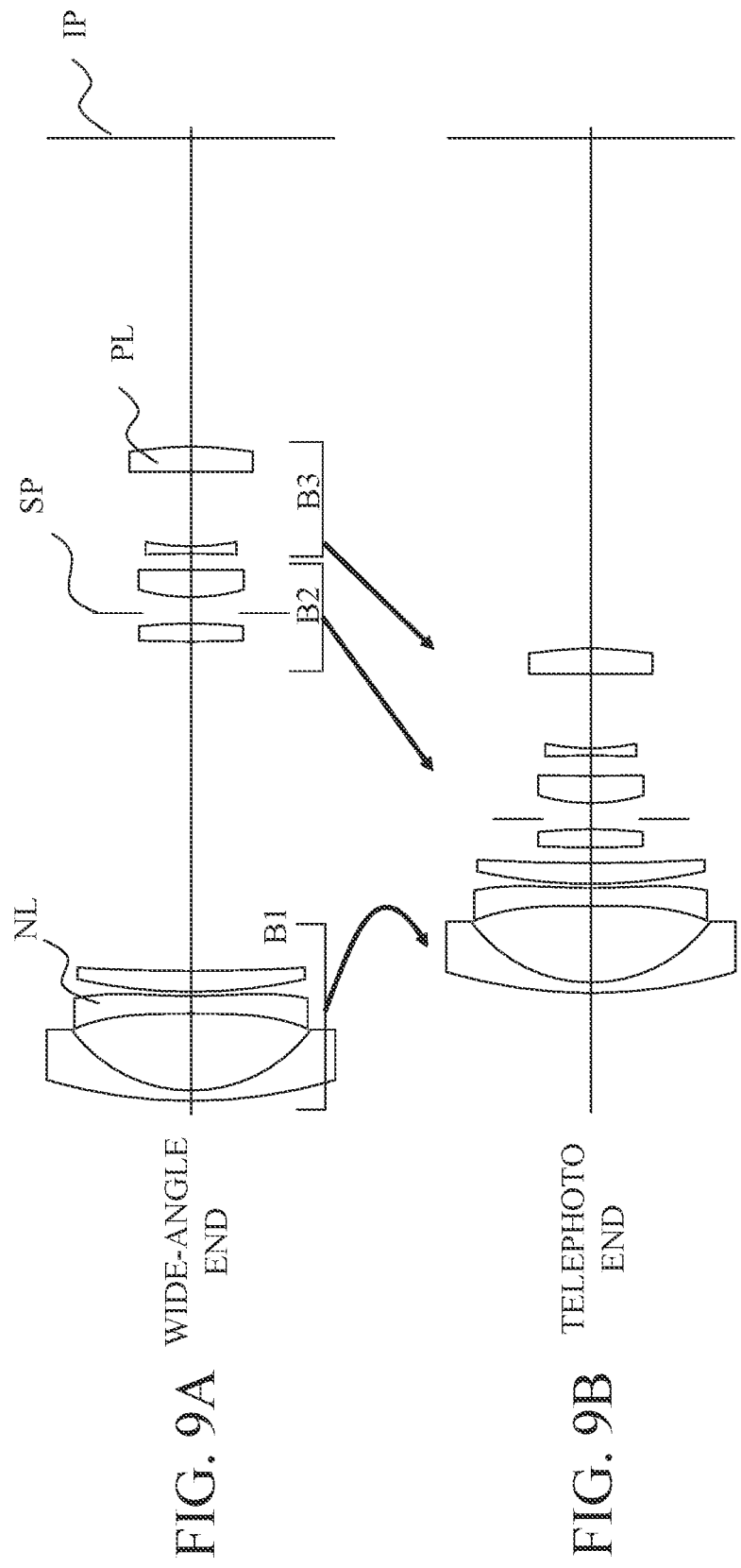

ZOOM LENS AND IMAGE PICKUP APPARATUS

BACKGROUND OF THE INVENTION

Field of the Invention

The present invention relates to a zoom lens suitable for an image pickup apparatus.

Description of the Related Art

Japanese Patent Laid-Open No. ("JP") 2014-178388 discloses a negative lead type zoom lens, which includes a lens unit that is closest to an object and has a negative refractive power, and serves as a zoom lens used for an image pickup apparatus, such as a still camera, a video camera, and a surveillance camera.

However, weight saving of the zoom lens is insufficient because structures and power arrangement of the plurality of lens units in the zoom lens disclosed in JP 2014-178388 are improper.

SUMMARY OF THE INVENTION

The present invention provides a lightweight zoom lens.

A zoom lens according to one aspect of the present invention includes, in order from an object side to an image side, a first lens unit having a negative refractive power, a second lens unit having a positive refractive power, and a rear unit including one or more lens units. Distances between adjacent lens units change during zooming. The first lens unit and the second lens unit move during zooming. The first lens unit includes a negative lens made of resin. The rear unit includes a positive lens made of resin. The following conditions are satisfied:

$$40.0 \leq vd\_NL$$

$$0.005 \leq \theta gF\_NL - 0.6438 + 0.001682 \times vd\_NL$$

$$40.0 \leq vd\_PL$$

$$0.005 \leq \theta gF\_PL - 0.6438 + 0.001682 \times vd\_PL$$

$$0.1 \leq f\_PL/fT \leq 2.0$$

$$0.9 \leq LPT/fT \leq 5.0$$

where vd_NL is an Abbe number of the negative lens for d-line, θgF_NL is a partial dispersion ratio of the negative lens for g-line and F-line, vd_PL is an Abbe number of the positive lens for the d-line, θgF_PL is a partial dispersion ratio of the positive lens for the g-line and the F-lines, f_PL is a focal length of the positive lens, fT is a focal length at a telephoto end of the zoom lens, and LPT is a distance from the positive lens to an image plane at the telephoto end.

An image pickup apparatus having the above zoom lens also constitutes another aspect of the present invention.

Further features of the present invention will become apparent from the following description of exemplary embodiments with reference to the attached drawings.

BRIEF DESCRIPTION OF THE DRAWINGS

FIGS. 1A and 1B are sectional views of a zoom lens according to Example 1 of the present invention at a wide-angle end and a telephoto end.

FIGS. 3A and 3B are sectional views of a zoom lens according to Example 2 of the present invention at a wide-angle end and a telephoto end.

FIGS. 5A and 5B are sectional views of a zoom lens according to Example 3 of the present invention at a wide-angle end and a telephoto end.

FIGS. 7A and 7B are sectional views of a zoom lens according to Example 4 of the present invention at a wide-angle end and a telephoto end.

FIGS. 9A and 9B are sectional views of a zoom lens according to Example 5 of the present invention at a wide-angle end and a telephoto end.

DESCRIPTION OF THE EMBODIMENTS

Figures 2A, 2B:
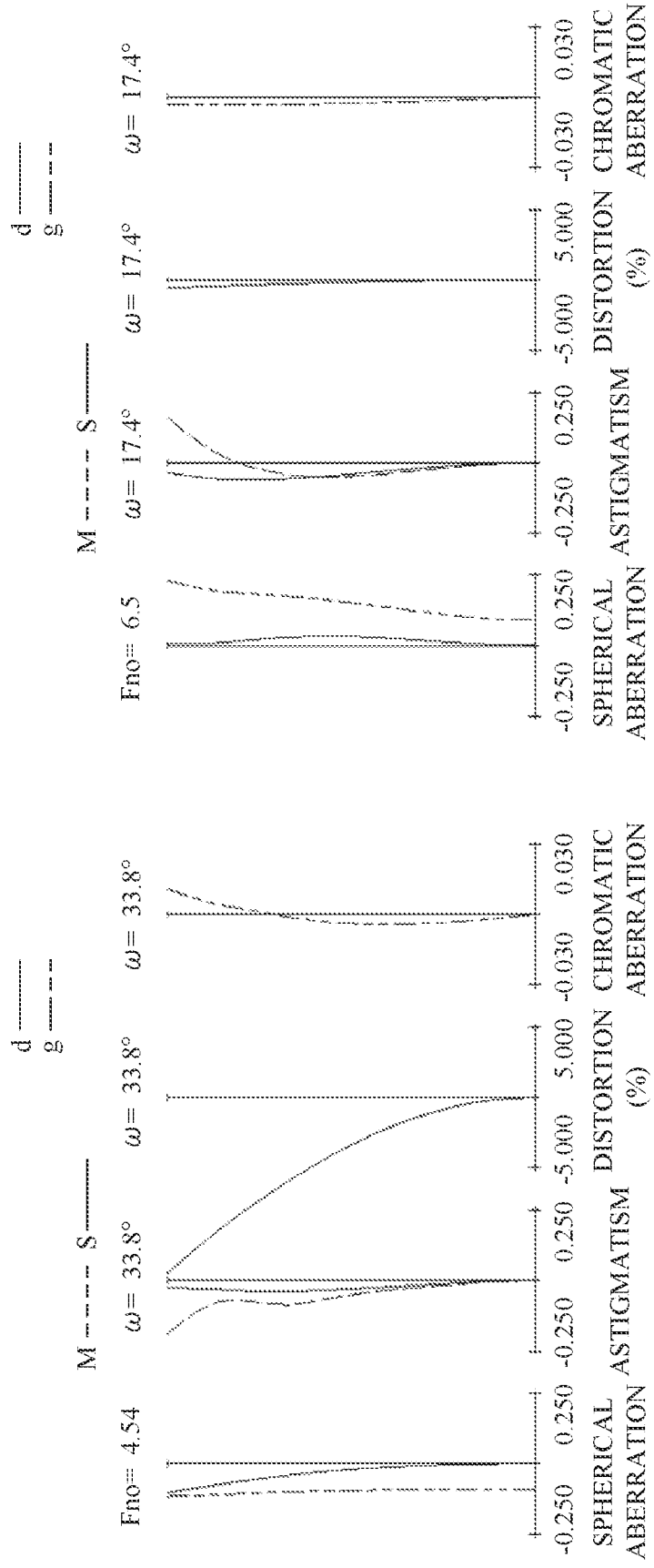
FIGS. 2A and 2B are longitudinal aberration diagrams of the zoom lens according to Example 1 at the wide-angle end and the telephoto end.

Referring now to the accompanying drawings, a description will be given of examples according to the present invention. A zoom lens according to each example is usable for an imaging optical system in an image pickup apparatus such as a still camera, a video camera, a television camera, and a surveillance camera, and is also usable for a projection optical system in an image projection apparatus (projector). In the description of each example, it is used for the imaging optical system.

FIGS. 1A, 1B, 3A, 3B, 5A, 5B, 7A, 7B, 9A, and 9B illustrate sections of zoom lenses according to Examples 1, 2, 3, 4, and 5 at a wide-angle end and a telephoto end, respectively. In each sectional view, a left side is an object side (front side), and a right side is an image side (rear side). Where i is the order of a lens unit counted from the object side to the image side, Bi indicates an i-th lens unit. An aperture stop (diaphragm) SP restricts (limits) a luminous flux of an open F-number (Fno).

When the zoom lens according to each example is used for the imaging optical system, an imaging plane of a solid-state image sensor (photoelectric conversion element), such as a CCD sensor and a CMOS sensor, or a film plane is disposed on an image plane IP. The "wide-angle end" and the "telephoto end" mean zoom positions when each lens unit is located at both ends of the movable range. During zooming from the wide-angle end to the telephoto end, each lens unit moves in the optical axis direction so as to draw a locus indicated by a solid arrow in each figure.

The zoom lens according to each example includes, in order from the object side to the image side, a first lens unit B1 having a negative refractive power, a second lens unit B2 having a positive refractive power, and a rear unit having a positive or negative refractive power. The rear unit includes at least one lens unit. The zoom lens according to each example provides a magnification variation (zooming)

between the wide-angle end and the telephoto end, as a result of that at least the first lens unit B1 and the second lens unit B2 move on the optical axis and a distance between adjacent lens units changes.

The first lens unit includes a negative lens NL, and the rear unit includes a positive lens PL. Both the negative lens NL and the positive lens PL are resin lenses, which facilitates weight saving of the zoom lens.

The zoom lens according to each example satisfies the following conditional expressions (1) to (6):

$$40.0 \leq vd\_NL \quad (1)$$

$$0.005 \leq \theta gF\_NL - 0.6438 + 0.001682 \times vd\_NL \quad (2)$$

$$40.0 \leq vd\_PL \quad (3)$$

$$0.005 \leq \theta gF\_PL - 0.6438 + 0.001682 \times vd\_PL \quad (4)$$

$$0.1 \leq f\_PL/fT \leq 2.0 \quad (5)$$

$$0.9 \leq LPT/fT \leq 5.0 \quad (6)$$

wherein vd_NL is an Abbe number of the negative lens NL for the d-line, θgF_NL is a partial dispersion ratio of the negative lens NL for the g-line and the F-line, vd_PL is an Abbe number of the positive lens PL for the d-line, θgF_PL is a partial dispersion ratio of the positive lens PL for the g-line and the F-line, f_PL is a focal length of the positive lens PL, fT is a focal length at the telephoto end of the zoom lens, and LPT is a distance from the positive lens PL of the zoom lens at the telephoto end to the image plane IP.

The conditional expression (1) indicates a condition on the Abbe number of the negative lens NL. If the negative lens NL has a high dispersion so that vd_NL is lower than the lower limit in the conditional expression (1), it becomes difficult to correct the first-order lateral chromatic aberration at the wide-angle end. If vd_NL becomes too large, a material having a low refractive index will be selected, and the edge thickness will increase and hinder weight saving. Thus, an upper limit value may be set in the conditional expression (1) as described later.

The conditional expression (2) indicates a condition on the partial dispersion ratio of the negative lens NL. If θgF_NL−0.6438+0.001682×vd_NL is lower than the lower limit in the conditional expression (2), it becomes difficult to correct the second-order lateral chromatic aberration at the wide-angle end. If θgF_NL−0.6438+0.001682×vd_NL becomes too large, it becomes difficult to correct the second-order chromatic aberration at the wide-angle end. Thus, an upper limit value may be set in the conditional expression (2) as described later.

The conditional expression (3) indicates a condition on the Abbe number of the positive lens PL. If the positive lens PL has a high dispersion so that vd_PL is lower than the lower limit in the conditional expression (3), it becomes difficult to correct the first-order lateral chromatic aberration at the wide-angle end and the first-order longitudinal chromatic aberration at the telephoto end. If vd_PL becomes too large, a material having a low refractive index will be selected, and the edge thickness will increase and hinder weight saving. Therefore, an upper limit value may be set in the conditional expression (3) as described later . . . .

The conditional expression (4) indicates a condition on the partial dispersion ratio of the positive lens PL. If the value is lower than the lower limit in the conditional expression (4), it becomes difficult to correct the second-order lateral chromatic aberration at the wide-angle end and the second-order longitudinal chromatic aberration at the telephoto end. If the value of the conditional expression (4) becomes too large, it becomes difficult to correct the second-order lateral chromatic aberration at the wide-angle end and the second-order longitudinal chromatic aberration at the telephoto end. Therefore, an upper limit may be set as in the conditional expression (4) will be described later.

The conditional expression (5) indicates a condition on the refractive power of the positive lens PL. If the refractive power of the positive lens PL is weakened so that f_PL/fT is higher than the upper limit in the conditional expression (5), it becomes difficult to correct the lateral chromatic aberration at the wide-angle end and the longitudinal chromatic aberration at the telephoto end. If the refractive power of the positive lens PL becomes too strong so that f_PL/fT is lower than the lower limit in the conditional expression (5), the thickness of the positive lens PL and the sensitivity to the manufacturing error of the surface accuracy become too high.

The conditional expression (6) indicates a condition on the position of the positive lens PL at the telephoto end. If the positive lens PL is separated from the image plane IP so that LPT/fT is higher than the upper limit in the conditional expression (6), the thickness of the positive lens PL and the sensitivity to the manufacturing error of the surface accuracy become too high. If the positive lens PL becomes closer to the image plane IP so that the LPT/fT is lower than the lower limit in the conditional expression (6), it becomes difficult to correct the longitudinal chromatic aberration at the telephoto end.

Satisfying the conditional expressions (1) to (6) described above will be able to provide a lightweight zoom lens having a high optical performance. In calculating the distance LPT from the positive lens PL to the image plane IP, when an optical element (such as a prism, a cover glass, and a filter) having substantially no refractive power is disposed on the object side of the zoom lens, the distance LPT is calculated without the optical element.

The zoom lens according to each example may further satisfy at least one of the following conditional expressions (7) to (15), where D1 is a thickness of the first lens unit B1 on the optical axis, f1 is a focal length of the first lens unit B1, fW is a focal length at the wide-angle end of the zoom lens, and LPW is a distance from the positive lens PL at the wide-angle end to the image plane IP, Nd_NL is a refractive index of the negative lens NL with respect to the d line, Nd_PL is a refractive index of the positive lens PL for the d-line, d_NL is a specific gravity of the negative lens NL, d_NL is a specific gravity of the positive lens PL, and f2 is a focal length of the second lens unit B2.

$$0.00 < D1/|f1| \leq 0.50 \quad (7)$$

$$1.0 \leq LPW/fW \leq 2.2 \quad (8)$$

$$0.00 < LPW/LPT \leq 0.9 \quad (9)$$

$$1.480 \leq Nd\_NL \quad (10)$$

$$1.480 \leq Nd\_PL \quad (11)$$

$$d\_NL \leq 2.0 \quad (12)$$

$$d\_PL \leq 2.0 \quad (13)$$

$$1.0 \leq |f1|/fW \leq 3.0 \quad (14)$$

$$0.50 \leq f2/fW \leq 1.50 \quad (15)$$

The conditional expression (7) indicates a condition on the thickness D1 of the first lens unit B1. If the thickness D1 of the first lens unit B1 is increased so that D1/|f1| is higher than the upper limit in the conditional expression (7), it becomes difficult to reduce the weight of the zoom lens. When D1/|f1| satisfies the conditional expression (7), the weight of the zoom lens can be easily reduced.

The conditional expression (8) indicates a condition on the position of the positive lens PL at the wide-angle end. If the positive lens PL is more distant from the image plane IP so that the LPW/fW is higher than the upper limit in the conditional expression (8), it becomes difficult to correct the lateral chromatic aberration at the wide-angle end. If the positive lens PL is closer to the image plane IP so that the LPW/fW is lower than the lower limit in the conditional expression (8), the lens diameter becomes large and it becomes difficult to reduce the weight of the zoom lens.

The conditional expression (9) indicates a condition on the position of the positive lens PL at the wide-angle end and the position of the positive lens PL at the telephoto end. When LPW/LPT satisfies the conditional expression (9), the lateral chromatic aberration at the wide-angle end and the longitudinal chromatic aberration at the telephoto end can be satisfactorily corrected.

The conditional expression (10) indicates a condition on the refractive index of the negative lens NL. If Nd_NL is lower than the lower limit in the conditional expression (10), the edge thickness of the negative lens NL becomes larger in order for the negative lens NL to have the required power, and it becomes difficult to reduce the weight of the zoom lens. If the value of Nd_NL becomes too large, a material having a low refractive index will be selected, and the edge thickness will increase and hinder weight saving. Therefore, the upper limit value may be set to the conditional expression (10) as described later.

The conditional expression (11) indicates a condition on the refractive index of the positive lens PL. When Nd_PL is lower than the lower limit in the conditional expression (11), the central thickness of the positive lens PL becomes large so as to maintain required power, and it becomes difficult to reduce the weight of the zoom lens. If the value of Nd_PL becomes too large, a material having a low refractive index will be selected, and the edge thickness will increase and hinder weight saving. Therefore, the upper limit value may be set to the conditional expression (11) as described later.

The conditional expression (12) indicates a condition on the specific gravity of the negative lens NL. When d_NL satisfies the conditional expression (12), the weight of the zoom lens can be easily reduced. If the value of d_NL becomes too small, the rigidity of the lens becomes weak and it becomes difficult to handle the lens. Therefore, the lower limit value may be set to the conditional expression (12) as described later.

The conditional expression (13) indicates a condition on the specific gravity of the positive lens PL. Satisfying the range of the d_PL conditional expression (13) facilitates weight saving of the optical system. If the value of d_PL becomes too small, the rigidity of the lens becomes weak and it becomes difficult to handle the lens. Therefore, the lower limit value may be set to the conditional expression (13) as described later.

The conditional expression (14) indicates a condition on a relationship between the focal length f1 of the first lens unit B1 and the focal length fW of the zoom lens at the wide-angle end. If the refractive power of the first lens unit B1 is weak so that |f1|/fW is higher than the upper limit in the conditional expression (14), it becomes difficult to make compact the zoom lens. If the refractive power of the first lens unit B1 is strong so that |f1|/fW is lower than the lower limit in the conditional expression (14), it becomes difficult to suppress fluctuations in coma during zooming.

The conditional expression (15) indicates a condition on a relationship between the focal length f2 of the second lens unit B2 and the focal length fW of the zoom lens at the wide-angle end. If the refractive power of the second lens unit B2 is weak so that f2/fW is higher than the upper limit in the conditional expression (15), it becomes difficult to make compact the zoom lens. If the refractive power of the second lens unit B2 is strong so that f2/fW is lower than the lower limit in the conditional expression (15), it becomes difficult to suppress the spherical aberration and coma aberration particularly at the telephoto end.

At least one of the negative lens NL and the positive lens PL may have an aspherical surface. When the negative lens NL has an aspherical surface, it becomes possible to suppress the curvature of field and astigmatism at the wide-angle end. When the positive lens PL has an aspherical surface, it becomes possible to suppress the curvature of field and astigmatism at the telephoto end.

The lens G1 closest to the object in the first lens unit B1 may be a glass lens. The lens G1 made of glass can secure sufficient robustness. When the lens G1 has a negative refractive power, the lens diameter of the lens G1 can be reduced, and the weight of the zoom lens can be easily reduced.

The numerical ranges of the conditional expressions (1) to (15) may be set as follows:

$$45.0 \leq vd\_NL \leq 70.0 \tag{1a}$$

$$0.007 \leq \theta gF\_NL - 0.6438 + 0.001682 \times vd\_NL \leq 0.030 \tag{2a}$$

$$40.0 \leq vd\_PL \leq 70.0 \tag{3a}$$

$$0.006 \leq \theta gF\_PL - 0.6438 + 0.001682 \times vd\_PL \leq 0.030 \tag{4a}$$

$$0.5 \leq f\_PL/fT \leq 1.8 \tag{5a}$$

$$1.0 \leq LPT/fT \leq 2.5 \tag{6a}$$

$$0.00 \leq D1/|f1| \leq 0.46 \tag{7a}$$

$$1.2 \leq LPW/fW \leq 2.0 \tag{8a}$$

$$0.00 < LPW/LPT \leq 0.8 \tag{9a}$$

$$1.500 \leq Nd\_NL \leq 1.650 \tag{10a}$$

$$1.500 \leq Nd\_PL \leq 1.650 \tag{11a}$$

$$0.8 \leq d\_NL \leq 1.5 \tag{12a}$$

$$0.8 \leq d\_PL \leq 1.5 \tag{13a}$$

$$1.3 \leq |f1|/fw \leq 2.5 \tag{14a}$$

$$0.65 \leq f2/fw \leq 1.25 \tag{15a}$$

The numerical ranges of the conditional expressions (1) to (15) may be set as follows:

$$50.0 \leq vd\_n1 \leq 60.0 \tag{1b}$$

$$0.010 \leq \theta gf\_n1 - 0.6438 + 0.001682 \times vd\_n1 \leq 0.020 \tag{2b}$$

$$40.0 \leq vd\_p1 \leq 60.0 \tag{3b}$$

$$0.010 \leq \theta gf\_p1 - 0.6438 + 0.001682 \times vd\_p1 \leq 0.020 \tag{4b}$$

$$0.8 \le f\_p1/ft \le 1.6 \quad (5b)$$

$$1.1 \le lpt/ft \le 1.5 \quad (6b)$$

$$0.00 < d1/|f1| \le 0.42 \quad (7b)$$

$$1.4 \le lpw/fw \le 1.8 \quad (8b)$$

$$0.00 \le lpw/lpt \le 0.7 \quad (9b)$$

$$1.520 \le nd\_n1 \le 1.600 \quad (10b)$$

$$1.520 \le nd\_p1 \le 1.600 \quad (11b)$$

$$0.9 \le d\_n1 \le 1.3 \quad (12b)$$

$$0.9 \le d\_p1 \le 1.3 \quad (13b)$$

$$1.5 \le |f1|/fw \le 2.0 \quad (14b)$$

$$0.75 \le f2/fw \le 1.00 \quad (15b)$$

Example 1

The zoom lens according to Example 1 illustrated in FIGS. 1A and 1B includes, in order from the object side to the image side, a first lens unit B1 having a negative refractive power, a second lens unit B2 having a positive refractive power, and a third lens unit B3 as a rear unit having a positive refractive power.

In the zoom lens according to this example, the first lens unit B1 moves to the image side and the second lens unit B2 and the third lens unit B3 move to the object side during zooming from the wide-angle end to the telephoto end. At that time, the distance between the first lens unit B1 and the second lens unit B2 is narrowed, and the distance between the second lens unit B2 and the third lens unit B3 is also narrowed.

A subunit 2B in the second lens unit B2 is a focus lens unit that moves on the optical axis during focusing, and moves from the object side to the image side during focusing from an object at infinity (infinity object) to a close (or short-distance) object.

FIGS. 2A and 2B illustrate longitudinal aberration diagrams during focusing on the infinity object of the zoom lens according to this example at the wide-angle end and the telephoto end, respectively. In the longitudinal aberration diagram, Fno represents an F-number and w represents a half angle of view (°). In the spherical aberration diagram, a solid line shows the spherical aberration for the d-line (wavelength 587.6 nm), and an alternate long and two short dashes line shows the spherical aberration for the g-line (wavelength 435.8 nm). In the astigmatism diagram, a solid line shows a sagittal image plane (S), and a broken line shows a meridional image plane (M). The distortion diagram shows the distortion for the d-line. The chromatic aberration diagram shows the lateral chromatic aberration for the g-line. These definitions are similarly applied to the longitudinal aberration diagrams in other examples.

Example 2

The zoom lens according to Example 2 illustrated in FIGS. 3A and 3B includes, in order from the object side to the image side, a first lens unit B1 having a negative refractive power, a second lens unit B2 having a positive refractive power, a third lens unit B3 having a negative refractive power, and a fourth lens unit B4 having a positive refractive power. The third lens unit B3 and the fourth lens unit B4 constitute a rear unit.

In the zoom lens according to this example, the first lens unit B1 moves to the image side and the second lens unit B2 to the fourth lens unit B4 move to the object side during zooming from the wide-angle end to the telephoto end. At that time, the distance between the first lens unit B1 and the second lens unit B2 is narrowed, the distance between the second lens unit B2 and the third lens unit B3 is widened, and the distance between the third lens unit B3 and the fourth lens unit B4 is narrowed. The third lens unit B3 is a focus lens unit, and moves from the object side to the image side during focusing from the infinity object to the close object.

Figures 4A, 4B:
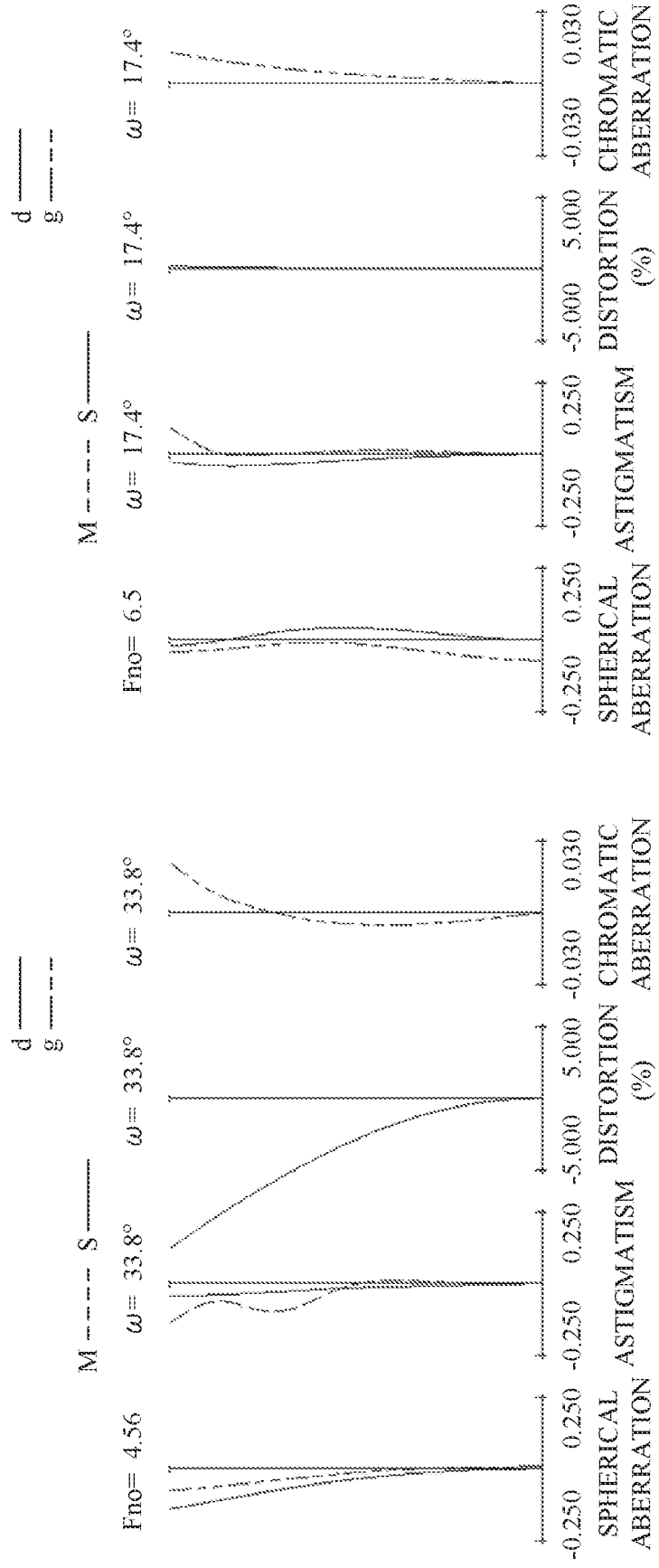
FIGS. 4A and 4B are longitudinal aberration diagrams of the zoom lens according to Example 2 at the wide-angle end and the telephoto end.

FIGS. 4A and 4B are longitudinal aberration diagrams during focusing on the infinity object at the wide-angle end and the telephoto end of the zoom lens according to this example, respectively.

Example 3

The zoom lens according to Example 3 illustrated in FIGS. 5A and 5B includes, in order from the object side to the image side, a first lens unit B1 having a negative refractive power, a second lens unit B2 having a positive refractive power, a third lens unit B3 having a negative refractive power, and a fourth lens unit B4 having a positive refractive power. The third lens unit B3 and the fourth lens unit B4 constitute a rear unit.

In the zoom lens according to this example, the first lens unit B1 moves to the image side and the second lens unit B2 to the fourth lens unit B4 move to the object side during zooming from the wide-angle end to the telephoto end. At that time, the distance between the first lens unit B1 and the second lens unit B2 is narrowed, the distance between the second lens unit B2 and the third lens unit B3 is widened, and the distance between the third lens unit B3 and the fourth lens unit B4 is narrowed. The third lens unit B3 is a focus lens unit, and moves from the object side to the image side during focusing from the infinity object to the near object.

Figures 6A, 6B:
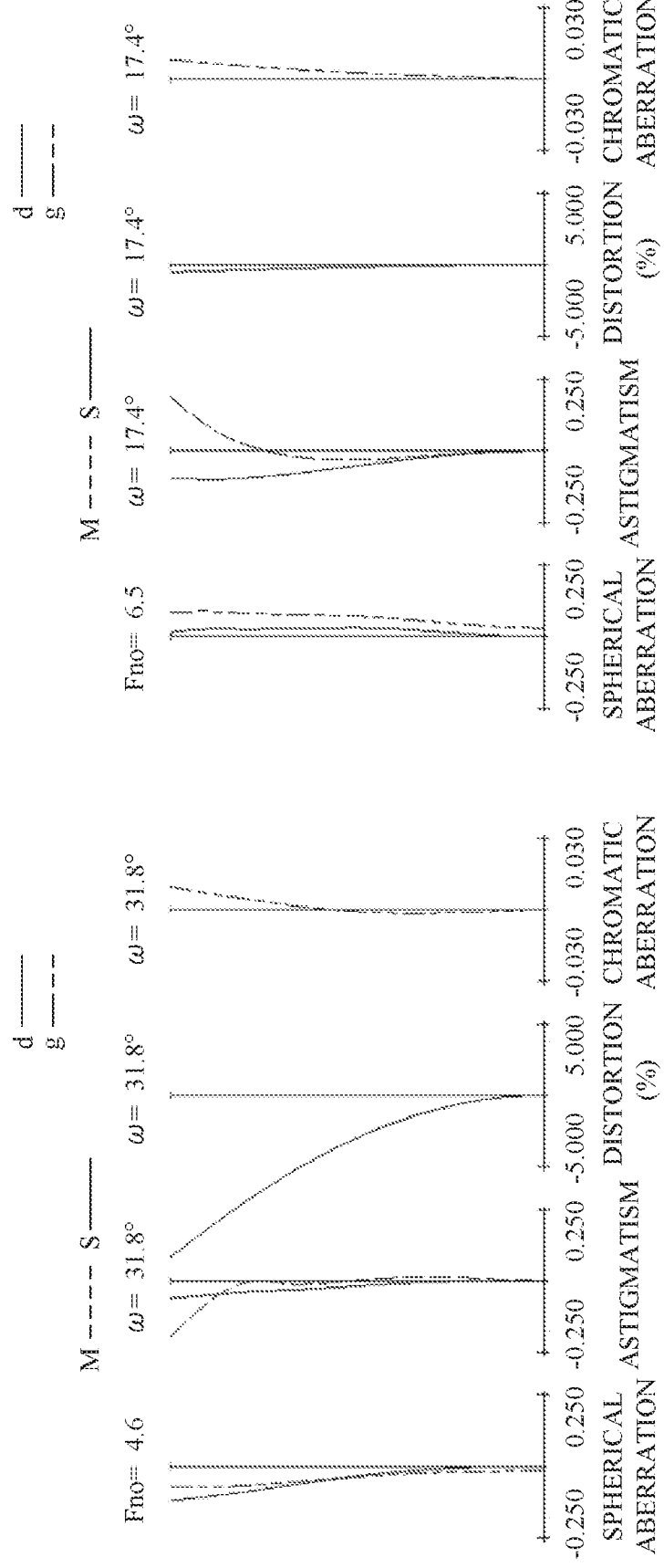
FIGS. 6A and 6B are longitudinal aberration diagrams of the zoom lens according to Example 3 at the wide-angle end and the telephoto end.

FIGS. 6A and 6B are longitudinal aberration diagrams during focusing on an infinity object at the wide-angle end and the telephoto end of the zoom lens according to this example, respectively.

Example 4

The zoom lens according to Example 4 illustrated in FIGS. 7A and 7B includes, in order from the object side to the image side, a first lens unit B1 having a negative refractive power, a second lens unit B2 having a positive refractive power, a third lens unit B3 having a negative refractive power, and a fourth lens unit B4 having a positive refractive power. The third lens unit B3 and the fourth lens unit B4 constitute a rear unit.

In the zoom lens according to this example, the first lens unit B1 moves to the image side and the second lens unit B2 to the fourth lens unit B4 move to the object side during zooming from the wide-angle end to the telephoto end. At that time, the distance between the first lens unit B1 and the second lens unit B2 is narrowed, the distance between the second lens unit B2 and the third lens unit B3 is widened, and the distance between the third lens unit B3 and the fourth lens unit B4 is narrowed. The third lens unit B3 is a focus lens unit, and moves from the object side to the image side during focusing from the infinity object to the close object.

Figures 8A, 8B:
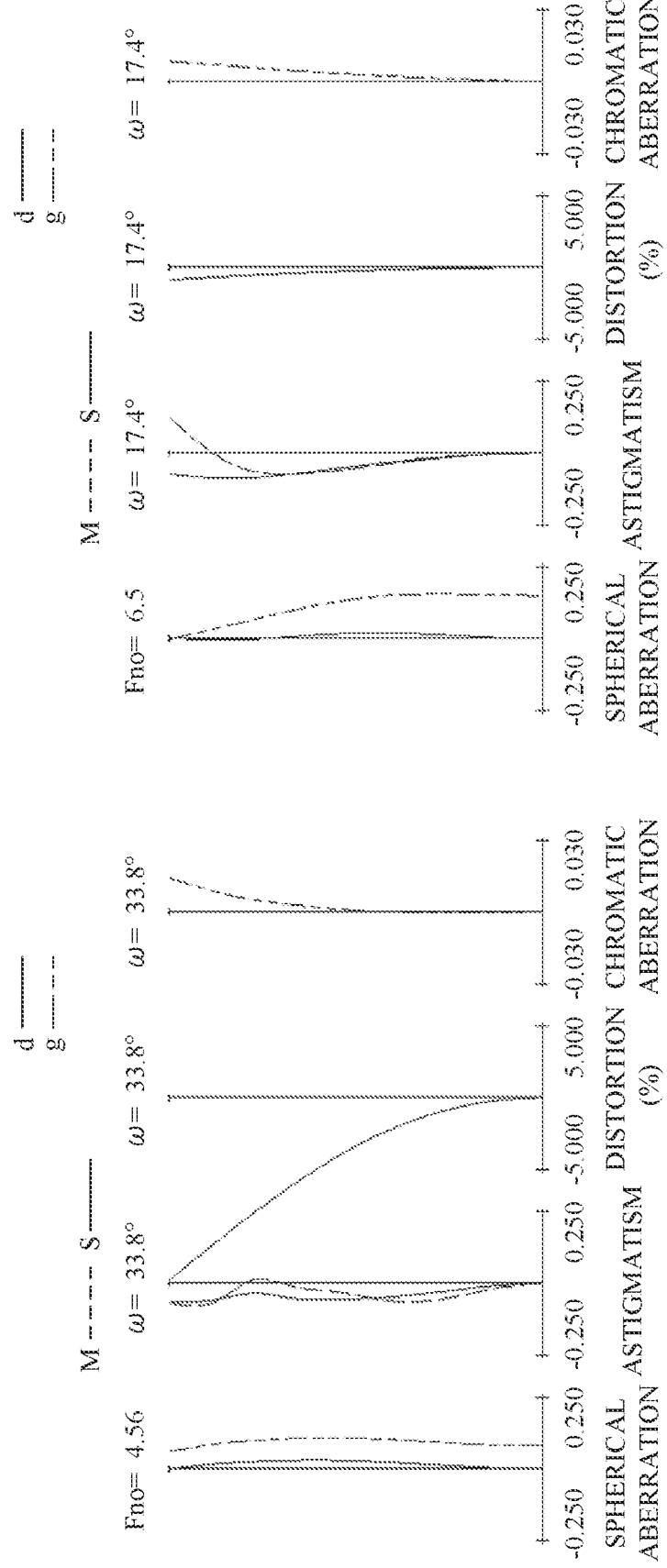
FIGS. 8A and 8B are longitudinal aberration diagrams of the zoom lens according to Example 4 at the wide-angle end and the telephoto end.

FIGS. 8A and 8B are longitudinal aberration diagrams during focusing on the infinity object at the wide-angle end and the telephoto end of the zoom lens according to this example, respectively.

Example 5

The zoom lens according to Example 5 illustrated in FIGS. 9A and 9B includes, in order from the object side to the image side, a first lens unit B1 having a negative refractive power, a second lens unit B2 having a positive refractive power, and a third lens unit B3 as a rear unit having a negative refractive power.

In the zoom lens according to this example, the first lens unit B1 moves to the image side and the second lens unit B2 and the third lens unit B3 move to the object side during zooming from the wide-angle end to the telephoto end. At that time, the distance between the first lens unit B1 and the second lens unit B2 is narrowed, and the distance between the second lens unit B2 and the third lens unit B3 is widened.

The third lens unit B3 is a focus lens unit, and moves from the object side to the image side during focusing from the infinity object to the close object.

Figures 10A, 10B:
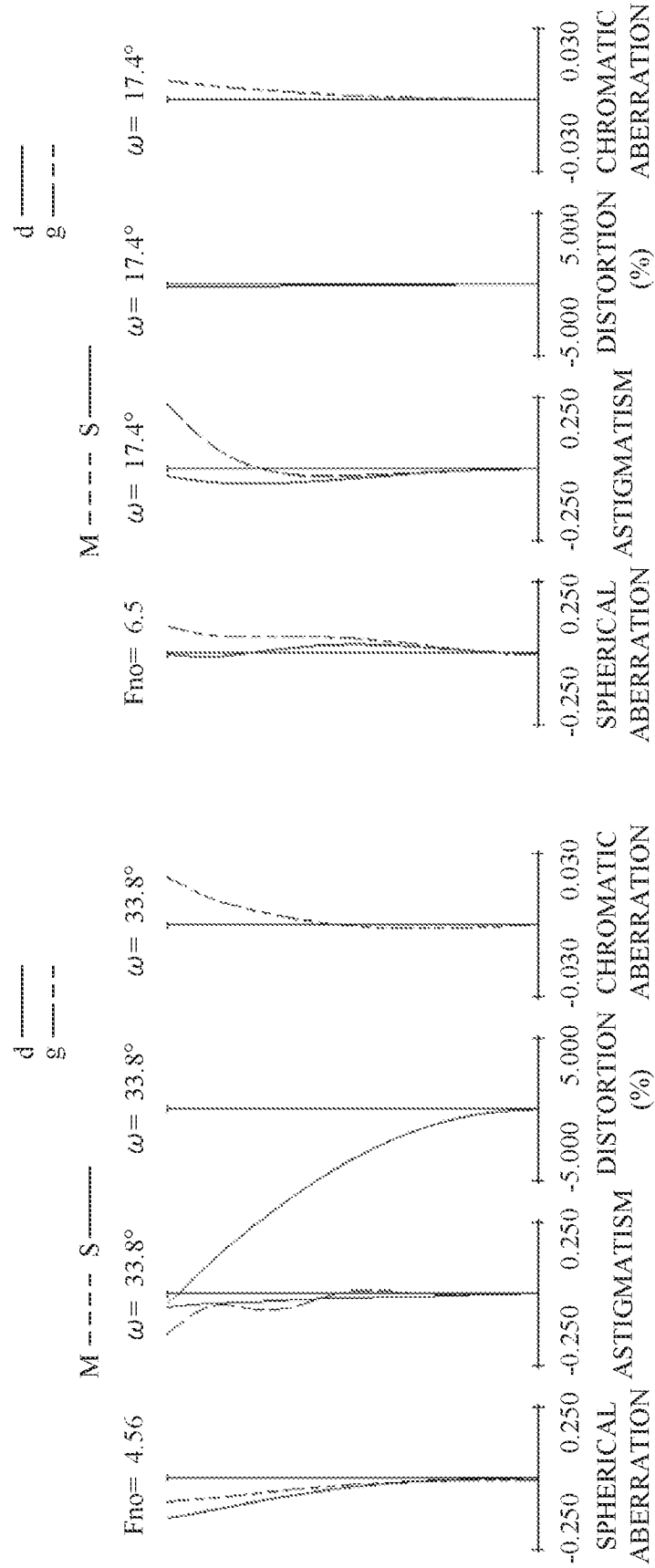
FIGS. 10A and 10B are longitudinal aberration diagrams of the zoom lens according to Example 5 at the wide-angle end and the telephoto end.

FIGS. 10A and 10B are longitudinal aberration diagrams during focusing on the infinity object at the wide-angle end and the telephoto end of the zoom lens according to this example, respectively.

The zoom lens according to each example may be used for an image stabilizing unit that reduces (corrects) an image blur by shifting one or part of the lens unit in the zoom lens relative to the optical axis.

The zoom lens according to each example has one focus lens unit, but may include a plurality of focus lens units to perform floating type focusing. The zoom lens according to each example may include a diffractive optical element and a catoptric optical member.

Specific numerical examples 1 to 5 of the zoom lenses according to Examples 1 to 5 will be illustrated hereinafter. In each numerical example, ri represents a radius of curvature (mm) of an i-th surface from the object side, and di represents a lens thickness or air spacing (mm) between an i-th and (i+1)-th surfaces. ndi represents a refractive index of a material of the i-th optical member for the d-line. vdi represents an Abbe number of the material of the i-th optical member for the d-line. The Abbe number vd is expressed as vd=(Nd−1)/(NF−NC) where Nd, NF, and NC are refractive indexes for the d-line (587.6 nm), the F-line (486.1 nm), and the C-line (656.3 nm) in the Fraunhofer line.

BF represents a backfocus (mm). The backfocus is expressed by an air conversion length on the optical axis from the final surface of the zoom lens (the lens surface closest to the image) to the paraxial image plane. The overall length of the zoom lens is the length obtained by adding the backfocus to the distance on the optical axis from the frontmost surface (the lens surface closest to the object) to the final surface.

An asterisk "*" attached to the surface number means that the surface is aspherical. The shape of the aspherical surface shape is expressed as follows, where x is a displacement amount from the surface vertex in the optical axis direction, h is a height from the optical axis in the direction orthogonal to the optical axis, R is a paraxial radius of curvature, k is a conical constant, and A4, A6, A8, and A10 are aspherical coefficients.

$$x=(h^2/R)/[1+\{1-(1+k)(h/R)^2\}^{1/2}+A4\times h^4+A6\times h^6+A8\times h^8+A10\times h^{10}$$

"E±XX" in each aspherical coefficient means "×10$^{\pm XX}$."

Table 1 summarizes values corresponding to the conditional expressions (1) to (15) in Examples 1 to 5.

Numerical Example 1

| UNIT: mm Surface Data | | | | | |
|---|---|---|---|---|---|
| Surface No. | r | d | nd | vd | Effective Diameter |
| 1 | 34.892 | 1.00 | 1.77250 | 49.6 | 25.99 |
| 2 | 14.252 | 7.09 | | | 21.79 |
| 3* | 1000.000 | 1.70 | 1.53110 | 55.9 | 21.26 (Lens NL) |
| 4* | 43.154 | 0.40 | | | 20.92 |
| 5 | 32.217 | 2.15 | 1.85478 | 24.8 | 20.54 |
| 6 | 68.862 | (Variable) | | | 20.03 |
| 7 | 140.046 | 1.73 | 1.67790 | 55.3 | 9.07 |
| 8 | −45.887 | 1.00 | | | 9.20 |
| 9(Diaphragm) | ∞ | 1.50 | | | 9.23 |
| 10 | 16.346 | 2.56 | 1.88300 | 40.8 | 9.27 |
| 11 | 161.968 | 1.58 | | | 8.75 |
| 12 | −107.752 | 0.70 | 1.84666 | 23.8 | 8.09 |
| 13 | 17.724 | (Variable) | | | 7.84 |
| 14* | −47.987 | 2.47 | 1.49171 | 57.4 | 9.62 (Lens PL) |
| 15* | −16.496 | (Variable) | | | 10.61 |
| Image Plane | ∞ | | | | |

Aspheric Data
3rd Surface
K=0.00000e+000 A 4=−1.23443e−004 A 6=6.41187e−007 A 8=−8.76998e−010 A10=−5.29610e−012
4th Surface
K=0.00000e+000 A 4=−1.33781e−004 A 6=7.27864e−007 A 8=−1.61418e−009 A10=−3.49272e−012
14th Surface
K=0.00000e+000 A 4=−8.39279e−005 A 6=3.77559e−007 A 8=−6.11987e−009 A10=1.31773e−011
15th Surface
K=0.00000e+000 A 4=−3.02891e−005 A 6=1.92534e−007

| VARIOUS DATA Zoom Ratio 2.35 | | | |
|---|---|---|---|
| | Wide-Angle | Middle | Telephoto |
| Focal Length: | 18.53 | 30.00 | 43.65 |
| F-NUMBER: | 4.54 | 5.43 | 6.50 |
| Half Angle of View: (°) | 33.78 | 24.48 | 17.38 |
| Image Height: | 12.40 | 13.66 | 13.66 |
| Overall Lens Length: | 92.00 | 81.80 | 83.05 |
| BF | 30.20 | 39.83 | 51.20 |
| d6 | 31.38 | 11.80 | 1.96 |
| d13 | 6.54 | 6.30 | 6.01 |
| d15 | 30.20 | 39.83 | 51.20 |

| Zoom Lens Unit Data | | | | | |
|---|---|---|---|---|---|
| Lens Unit | Starting Surface | Focal Length: | Lens Length | Front Principal Point Position | Rear Principal Point Position |
| 1 | 1 | −33.67 | 12.34 | 0.84 | −9.45 |
| 2 | 7 | 39.00 | 9.07 | −6.39 | −10.82 |
| 3 | 14 | 49.83 | 2.47 | 2.46 | 0.85 |

Lens Subunit Data

| | | | | | | |
|---|---|---|---|---|---|---|
| 2A | 7 | 15.15 | 6.79 | 2.71 | −2.27 |
| 2B | 12 | −17.93 | 0.70 | 0.32 | −0.05 |

Single Lens Data

| Lens | Starting Surface | Focal Length: |
|---|---|---|
| 1 | 1 | −31.86 |
| 2 | 3 | −77.85 |
| 3 | 5 | 68.96 |
| 4 | 7 | 51.18 |
| 5 | 10 | 20.42 |
| 6 | 12 | −17.93 |
| 7 | 14 | 49.83 |

Numerical Example 2

UNIT: mm
Surface Data

| Surface No. | r | d | nd | vd | Effective Diameter |
|---|---|---|---|---|---|
| 1 | 26.941 | 1.00 | 1.63854 | 55.4 | 24.79 |
| 2 | 12.045 | 7.49 | | | 20.24 |
| 3* | 1000.000 | 1.70 | 1.53110 | 55.9 | 19.64 (Lens NL) |
| 4* | 33.260 | 0.40 | | | 19.29 |
| 5 | 46.469 | 1.94 | 1.84666 | 23.8 | 19.03 |
| 6 | 174.749 | (Variable) | | | 18.63 |
| 7 | 139.916 | 1.73 | 1.69680 | 55.5 | 8.98 |
| 8 | −44.483 | 1.00 | | | 9.12 |
| 9(Diaphragm) | ∞ | 1.50 | | | 9.16 |
| 10 | 16.314 | 2.57 | 1.77250 | 49.6 | 9.23 |
| 11 | 156.410 | (Variable) | | | 8.76 |
| 12 | −384.505 | 0.70 | 1.84666 | 23.8 | 7.92 |
| 13 | 20.582 | (Variable) | | | 7.71 |
| 14* | −312.236 | 2.08 | 1.53110 | 55.9 | 10.79 (Lens PL) |
| 15* | −28.811 | (Variable) | | | 11.46 |
| Image Plane | ∞ | | | | |

Aspheric Data
3rd Surface
K=0 A 4=−1.41463e−004 A 6=7.66013e−007 A 8=−1.27190e−009 A10=−1.10963e−011
4th Surface
K=0 A 4=−1.69055e−004 A 6=8.63631e−007 A 8=−2.53183e−009 A10=−7.27576e−012
14th Surface
K=0 A 4=−9.44164e−006 A 6=5.54551e−007 A 8=−1.94972e−008 A10=2.35602e−010
15th Surface
K=0 A 4=3.12388e−005 A 6=2.31800e−007
Various Data
Zoom Ratio 2.35

| | Wide-Angle | Middle | Telephoto |
|---|---|---|---|
| Focal Length: | 18.53 | 30.00 | 43.65 |
| F-NUMBER: | 4.56 | 5.48 | 6.50 |
| Half Angle of View: (°) | 33.78 | 24.48 | 17.38 |
| Image Height: | 12.40 | 13.66 | 13.66 |
| Overall Lens Length: | 89.11 | 81.23 | 81.40 |
| BF | 28.48 | 38.21 | 47.77 |
| d6 | 28.48 | 10.86 | 1.48 |
| d11 | 1.53 | 1.64 | 2.28 |
| d13 | 8.52 | 8.41 | 7.77 |
| d15 | 28.48 | 38.21 | 47.77 |

Zoom Lens Unit Data

| Lens Unit | Starting Surface | Focal Length: | Lens Length | Front Principal Point Position | Rear Principal Point Position |
|---|---|---|---|---|---|
| 1 | 1 | −31.01 | 12.52 | 1.87 | −8.64 |
| 2 | 7 | 16.38 | 6.79 | 2.58 | −2.47 |
| 3 | 12 | −23.06 | 0.70 | 0.36 | −0.02 |
| 4 | 14 | 59.61 | 2.08 | 1.50 | 0.14 |

Single Lens Data

| Lens | Starting Surface | Focal Length: |
|---|---|---|
| 1 | 1 | −35.03 |
| 2 | 3 | −60.57 |
| 3 | 5 | 74.25 |
| 4 | 7 | 48.63 |
| 5 | 10 | 23.39 |
| 6 | 12 | −23.06 |
| 7 | 14 | 59.61 |

Numerical Example 3

UNIT: mm
Surface Data

| Surface No. | r | d | nd | vd | Effective Diameter |
|---|---|---|---|---|---|
| 1 | 43.041 | 1.00 | 1.67790 | 55.3 | 25.16 |
| 2 | 14.587 | 6.28 | | | 21.27 |
| 3* | −123.450 | 1.70 | 1.53110 | 55.9 | 20.78 (Lens NL) |
| 4* | 83.324 | 0.40 | | | 20.25 |
| 5 | 22.516 | 1.98 | 2.00069 | 25.5 | 19.73 |
| 6 | 30.884 | (Variable) | | | 19.02 |
| 7 | 111.170 | 1.73 | 1.72916 | 54.7 | 9.05 |
| 8 | −49.476 | 1.00 | | | 9.10 |
| 9(Diaphragm) | ∞ | 1.50 | | | 9.02 |
| 10 | 15.304 | 2.50 | 1.72916 | 54.7 | 8.90 |
| 11 | 55.762 | (Variable) | | | 8.39 |
| 12 | −414.445 | 0.70 | 1.85478 | 24.8 | 7.81 |
| 13 | 21.520 | (Variable) | | | 7.63 |
| 14* | −24.745 | 2.37 | 1.54390 | 56.1 | 8.43 (Lens PL) |
| 15* | −13.273 | (Variable) | | | 9.52 |
| Image Plane | ∞ | | | | |

Aspheric Data
3rd Surface
K=0.00000e+000 A 4=−1.06687e−005 A 6=−2.40190e−007 A 8=2.29892e−009 A10=−6.11185e−012
4th Surface
K=0.00000e+000 A 4=−9.59718e−006 A 6=−2.74436e−007 A 8=2.73461e−009 A10=−7.90906e−012
14th Surface
K=0.00000e+000 A 4=−1.65669e−004 A 6=−5.36961e−007 A 8=−3.86282e−008 A10=9.59619e−010
15th Surface
K=0.00000e+000 A 4=−7.58667e−005 A 6=−5.73278e−007

VARIOUS DATA
Zoom Ratio 2.18

|  | Wide-Angle | Middle | Telephoto |
|---|---|---|---|
| Focal Length: | 20.01 | 28.00 | 43.64 |
| F-NUMBER: | 4.60 | 5.23 | 6.50 |
| Half Angle of View: (°) | 31.79 | 26.01 | 17.38 |
| Image Height: | 12.40 | 13.66 | 13.66 |
| Overall Lens Length: | 90.65 | 82.07 | 80.61 |
| BF | 32.94 | 38.93 | 50.55 |
| d6 | 30.36 | 15.77 | 2.70 |
| d11 | 1.63 | 1.73 | 1.94 |
| d13 | 4.57 | 4.46 | 4.26 |
| d15 | 32.94 | 38.93 | 50.55 |

Zoom Lens Unit Data

| Lens Unit | Starting Surface | Focal Length: | Lens Length | Front Principal Point Position | Rear Principal Point Position |
|---|---|---|---|---|---|
| 1 | 1 | −35.89 | 11.36 | 1.05 | −8.10 |
| 2 | 7 | 18.20 | 6.73 | 2.16 | −2.82 |
| 3 | 12 | −23.92 | 0.70 | 0.36 | −0.02 |
| 4 | 14 | 49.07 | 2.37 | 3.09 | 1.66 |

Single Lens Data

| Lens | Starting Surface | Focal Length: |
|---|---|---|
| 1 | 1 | −33.02 |
| 2 | 3 | −93.40 |
| 3 | 5 | 74.28 |
| 4 | 7 | 47.17 |
| 5 | 10 | 28.19 |
| 6 | 12 | −23.92 |
| 7 | 14 | 49.07 |

Numerical Example 4

UNIT: mm
Surface Data

| Surface No. | r | d | nd | vd | Effective Diameter |
|---|---|---|---|---|---|
| 1 | 45.893 | 1.00 | 1.63854 | 55.4 | 27.09 |
| 2 | 14.386 | 7.03 |  |  | 22.30 |
| 3 | −85.298 | 1.70 | 1.53110 | 55.9 | 21.78 (Lens NL) |
| 4* | 97.643 | 0.40 |  |  | 21.12 |
| 5 | 23.337 | 2.24 | 1.84666 | 23.8 | 20.54 |
| 6 | 34.716 | (Variable) |  |  | 19.79 |
| 7(Diaphragm) | ∞ | 1.00 |  |  | 9.02 |
| 8* | 16.308 | 2.56 | 1.77250 | 49.6 | 9.36 |
| 9 | −58.463 | (Variable) |  |  | 9.12 |
| 10 | 42172.073 | 0.60 | 1.80810 | 22.8 | 8.03 |
| 11 | 19.038 | (Variable) |  |  | 7.82 |
| 12* | −263.369 | 2.08 | 1.53110 | 55.9 | 10.58 (Lens PL) |
| 13 | −27.990 | (Variable) |  |  | 11.27 |
| Image Plane | ∞ |  |  |  |  |

Aspheric Data
4th Surface
K=0 A 4=−4.47785e−006 A 6=4.80655e−008 A 8=−5.32262e−010 A10=1.27701e−012
8th Surface
K=0 A 4=−3.43112e−005 A 6=3.14927e−008 A 8=−2.95172e−009 A10=4.26192e−011
12th Surface
K=0 A 4=−3.22505e−005 A 6=1.56251e−007 A 8=−1.96015e−008 A10=3.12929e−010

VARIOUS DATA
Zoom Ratio 2.35

|  | Wide-Angle | Middle | Telephoto |
|---|---|---|---|
| Focal Length: | 18.53 | 26.00 | 43.60 |
| F-NUMBER: | 4.56 | 5.17 | 6.50 |
| Half Angle of View: (°) | 33.79 | 27.72 | 17.40 |
| Image Height: | 12.40 | 13.66 | 13.66 |
| Overall Lens Length: | 91.32 | 83.11 | 80.48 |
| BF | 29.73 | 36.16 | 48.88 |
| d6 | 32.64 | 18.00 | 2.64 |
| d9 | 2.37 | 2.28 | 2.75 |
| d11 | 7.98 | 8.08 | 7.61 |
| d13 | 29.73 | 36.16 | 48.88 |

Zoom Lens Unit Data

| Lens Unit | Starting Surface | Focal Length: | Lens Length | Front Principal Point Position | Rear Principal Point Position |
|---|---|---|---|---|---|
| 1 | 1 | −34.13 | 12.37 | 1.21 | −8.90 |
| 2 | 7 | 16.76 | 3.56 | 1.32 | −1.14 |
| 3 | 10 | −23.57 | 0.60 | 0.33 | 0.00 |
| 4 | 12 | 58.79 | 2.08 | 1.51 | 0.16 |

Single Lens Data

| Lens | Starting Surface | Focal Length: |
|---|---|---|
| 1 | 1 | −33.23 |
| 2 | 3 | −85.45 |
| 3 | 5 | 77.13 |
| 4 | 8 | 16.76 |
| 5 | 10 | −23.57 |
| 6 | 12 | 58.79 |

Numerical Example 5

UNIT: mm
Surface Data

| Surface No. | r | d | nd | vd | Effective Diameter |
|---|---|---|---|---|---|
| 1 | 48.059 | 1.00 | 1.63854 | 55.4 | 26.32 |
| 2 | 14.114 | 7.33 |  |  | 21.64 |
| 3* | −1000.000 | 1.70 | 1.53110 | 55.9 | 21.08 (Lens NL) |
| 4* | 51.376 | 0.40 |  |  | 20.96 |
| 5 | 49.503 | 1.99 | 1.84666 | 23.8 | 20.55 |
| 6 | 177.062 | (Variable) |  |  | 20.15 |
| 7 | 127.256 | 1.73 | 1.67790 | 55.3 | 9.12 |
| 8 | −47.359 | 1.00 |  |  | 9.25 |
| 9(Diaphragm) | ∞ | 1.50 |  |  | 9.27 |
| 10 | 17.235 | 2.61 | 1.80400 | 46.6 | 9.31 |
| 11 | 358.823 | (Variable) |  |  | 8.84 |
| 12 | −117.524 | 0.70 | 1.84666 | 23.8 | 8.08 |
| 13 | 21.736 | 7.12 |  |  | 7.87 |
| 14* | −221.529 | 2.41 | 1.53110 | 55.9 | 10.05 (Lens PL) |
| 15* | −28.819 | (Variable) |  |  | 10.82 |
| Image Plane | ∞ |  |  |  |  |

Aspheric Data
3rd Surface
K=0  A  4=−1.24978e−004  A  6=2.71294e−007  A 8=1.41979e−009 A10=−9.72356e−012
4th Surface
K=0  A  4=−1.37193e−004  A  6=3.71703e−007  A 8=7.25801e−010 A10=−7.69387e−012
14th Surface
K=0  A  4=4.49135e−005  A  6=1.54680e−006  A 8=−2.35020e−008 A10=2.91319e−010
15th Surface
K=0 A 4=7.57248e−005 A 6=1.14052e−006

Single Lens Data

| Lens | Starting Surface | Focal Length: |
|---|---|---|
| 1 | 1 | −31.66 |
| 2 | 3 | −91.96 |
| 3 | 5 | 80.58 |
| 4 | 7 | 51.12 |
| 5 | 10 | 22.44 |
| 6 | 12 | −21.62 |
| 7 | 14 | 62.11 |

TABLE 1

| | | Ex.1 | Ex.2 | Ex.3 | Ex.4 | Ex.5 |
|---|---|---|---|---|---|---|
| Less NL | Material Name Manufacturer | Zeonex E4SR Zees | Zeonex E4SR Zeon | Zeonex E48R Zeon | Zeonex ESR Zeon | Zeonex E4SR Zeon |
| Lets PL | Material Name Manufacturer | AcrypetVH001 Mitsubishi Chemical | Zeonex E4SR Zeon | APL5014DP Mitsui Chemical | Zeonex E48R Zeon | Zeonex E4SR Zeon |
| Condi. | (1) | 55.9 | 55.9 | 55.9 | 55.9 | 55.9 |
| Exp | (2) | 0.0187 | 0.0187 | 0.0187 | 0.0187 | 0.0187 |
| | (3) | 57.4 | 55.9 | 56.1 | 55.9 | 55.9 |
| | (4) | 0.0066 | 0.0187 | 0.0072 | 0.0187 | 0.0187 |
| | (5) | 1.142 | 1.366 | 1.124 | 1.348 | 1.423 |
| | (6) | 1.230 | 1.142 | 1.213 | 1.169 | 1.172 |
| | (7) | 0.367 | 0.404 | 0.316 | 0.362 | 0.368 |
| | (8) | 1.762 | 1.649 | 1.765 | 1.716 | 1.720 |
| | (9) | 0.609 | 0.613 | 0.667 | 0.624 | 0.623 |
| | (10) | 1.53110 | 1.53110 | 1.53110 | 1.53110 | 1.53110 |
| | (11) | 1.49171 | 1.53110 | 1.54390 | 1.53110 | 1.53110 |
| | (12) | 1.01 | 1.01 | 1.01 | 1.01 | 1.91 |
| | (13) | 1.19 | 1.01 | 1.04 | 1.01 | 1.01 |
| | (14) | 1.816 | 1.673 | 1.794 | 1.842 | 1.821 |
| | (15) | 0.817 | 0.884 | 0.909 | 0.904 | 0.874 |

VARIOUS DATA
Zoom Ratio 2.36

| | Wide-Angle | Middle | Telephoto |
|---|---|---|---|
| Focal Length: | 18.53 | 27.00 | 43.65 |
| F-NUMBER: | 4.56 | 5.23 | 6.50 |
| Half Angle of View: (°) | 33.79 | 26.84 | 17.38 |
| Image Height: | 12.40 | 13.66 | 13.66 |
| Overall Lens Length: | 92.00 | 82.86 | 81.68 |
| BF | 29.46 | 36.42 | 48.75 |
| d6 | 31.48 | 15.36 | 1.50 |
| d11 | 1.56 | 1.59 | 1.93 |
| d15 | 29.46 | 36.42 | 48.75 |

Zoom Lens Unit Data

| Lens Unit | Starting Surface | Focal Length: | Lens Length | Front Principal Point Position | Rear Principal Point Position |
|---|---|---|---|---|---|
| 1 | 1 | −33.74 | 12.42 | 0.44 | −10.21 |
| 2 | 7 | 16.19 | 6.84 | 2.71 | −2.37 |
| 3 | 12 | −42.61 | 10.23 | −5.84 | −17.47 |

Figure 11:
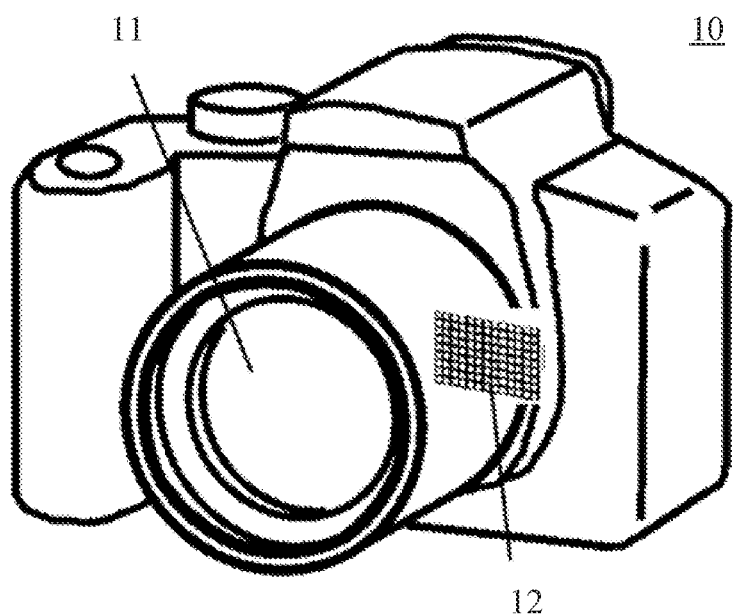
FIG. 11 is a schematic view of a digital camera using the zoom lens according to each example.

FIG. 11 illustrates a digital still camera that serves as an image pickup apparatus using the zoom lens according to one of the above examples for the imaging optical system. Reference numeral 10 denotes a camera body, and reference numeral 11 denotes an imaging optical system that includes the zoom lens according to any one of Examples 1 to 5. Reference numeral 12 denotes a solid-state image sensor (photoelectric conversion element), such as a CCD sensor and a CMOS sensor, that is built in the camera body 10 and captures an optical image formed by the imaging optical system 11. By using the zoom lens according to each example in this way, a compact camera can be obtained.

The camera body 10 may be a single-lens reflex camera having a quick turn mirror, or a mirrorless camera having no quick turn mirror.

Each of the above examples can provide a lightweight zoom lens.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-067831, filed on Apr. 3, 2020 which is hereby incorporated by reference herein in its entirety.

What is claimed is:

1. A zoom lens comprising, in order from an object side to an image side:
   a first lens unit having a negative refractive power;
   a second lens unit having a positive refractive power; and
   a rear unit including one or more lens units,
   wherein distances between adjacent lens units change during zooming,
   wherein the first lens unit and the second lens unit move during zooming,
   wherein the first lens unit includes a negative lens made of resin,
   wherein the rear unit includes a positive lens made of resin, and
   wherein the following inequalities are satisfied:

$40.0 \leq vd\_NL$ $0.005 \leq \theta gF\_NL - 0.6438 + 0.001682 \times vd\_NL$ $40.0 \leq vd\_PL$ $0.005 \leq \theta gF\_PL - 0.6438 + 0.001682 \times vd\_PL$ $0.1 \leq f\_PL/fT \leq 2.0$ $0.9 \leq LPT/fT \leq 5.0$ $0.00 < D1/|f1| \leq 0.50$ where vd_NL is an Abbe number of the negative lens for d-line, θgF_NL is a partial dispersion ratio of the negative lens for g-line and F-line, vd_PL is an Abbe number of the positive lens for the d-line, θgF_PL is a partial dispersion ratio of the positive lens for the g-line and the F-lines, f_PL is a focal length of the positive lens, fT is a focal length at a telephoto end of the zoom lens, LPT is a distance from the positive lens to an image plane at the telephoto end, D1 is a thickness of the first lens unit on an optical axis, and f1 is a focal length of the first lens unit.

2. The zoom lens according to claim 1, wherein the following inequality is satisfied:

$1.0 \leq LPW/fW \leq 2.2$ where fW is a focal length of the zoom lens at a wide-angle end, and LPW is a distance from the positive lens of the zoom lens at the wide-angle end to the image plane.

3. The zoom lens according to claim 1, wherein the following inequality is satisfied:

$0.00 \leq LPW/LPT \leq 0.9$ where LPW is a distance from the positive lens of the zoom lens at the wide-angle end to the image plane.

4. The zoom lens according to claim 1, wherein the following inequality is satisfied:

$1.480 \leq Nd\_NL$ where Nd_NL is a refractive index of the negative lens for the d-line.

5. The zoom lens according to claim 1, wherein the following inequality is satisfied:

$1.480 \leq Nd\_PL$ where Nd_PL is a refractive index of the positive lens for the d-line.

6. The zoom lens according to claim 1, wherein the following inequality is satisfied:

$d\_NL \leq 2.0$ where d_NL is a specific gravity of the negative lens.

7. The zoom lens according to claim 1, wherein the following inequality is satisfied:

$d\_PL \leq 2.0$ where d_PL is a specific gravity of the positive lens.

8. The zoom lens according to claim 1, wherein at least one of the negative lens and the positive lens has an aspherical surface.

9. The zoom lens according to claim 1, wherein the first lens unit includes a glass lens closest to an object.

10. The zoom lens according to claim 9, wherein the glass lens has a negative refractive power.

11. The zoom lens according to claim 1, wherein the following inequality is satisfied:

$1.0 \leq |f1|/fW \leq 3.0$ where f1 is a focal length of the first lens unit, and fW is a focal length of the zoom lens at the wide-angle end.

12. The zoom lens according to claim 1, wherein the following inequality is satisfied:

$0.50 \leq f2/fW \leq 1.50$ where f2 is a focal length of the second lens unit.

13. The zoom lens according to claim 1, wherein the rear unit consists of a third lens unit having a positive refractive power.

14. The zoom lens according to claim 1, wherein the rear unit consists, in order from the object side to the image side, of a third lens unit having a negative refractive power and a fourth lens unit having a positive refractive power.

15. The zoom lens according to claim 1, wherein the rear unit consists of a third lens unit having a negative refractive power.

16. An image pickup apparatus comprising:
    a zoom lens; and
    an image sensor configured to capture an optical image formed by the zoom lens,
    wherein the zoom lens includes, in order from an object side to an image side:
    a first lens unit having a negative refractive power;
    a second lens unit having a positive refractive power; and
    a rear unit including one or more lens units,
    wherein distances between adjacent lens units change during zooming,
    wherein the first lens unit and the second lens unit move during zooming,
    wherein the first lens unit includes a negative lens made of resin,
    wherein the rear unit includes a positive lens made of resin, and
    wherein the following inequalities are satisfied:

$40.0 \leq vd\_NL$ $0.005 \leq \theta gF\_NL - 0.6438 + 0.001682 \times vd\_NL$ $40.0 \leq vd\_PL$ $0.005 \leq \theta gF\_PL - 0.6438 + 0.001682 \times vd\_PL$ $0.1 \leq f\_PL/fT \leq 2.0$ $0.9 \leq LPT/fT \leq 5.0$ $0.00 < D1/|f1| \leq 0.50$ where vd_NL is an Abbe number of the negative lens for d-line, θgF_NL is a partial dispersion ratio of the negative lens for g-line and F-line, vd_PL is an Abbe number of the positive lens for the d-line, θgF_PL is a partial dispersion ratio of the positive lens for the g-line and the F-lines, f_PL is a focal length of the positive lens, fT is a focal length at a telephoto end of the zoom lens, LPT is a distance from the positive lens to an image plane at the telephoto end, D1 is a thickness of the first lens unit on an optical axis, and f1 is a focal length of the first lens unit.

17. A zoom lens comprising, in order from an object side to an image side:
   a first lens unit having a negative refractive power;
   a second lens unit having a positive refractive power; and
   a rear unit including one or more lens units,
   wherein distances between adjacent lens units change during zooming,
   wherein the first lens unit and the second lens unit move during zooming,
   wherein the first lens unit includes a negative lens made of resin,
   wherein the rear unit includes a positive lens made of resin, and
   wherein the following inequalities are satisfied:

$40.0 \leq vd\_NL$ $0.005 \leq \theta gF\_NL - 0.6438 + 0.001682 \times vd\_NL$ $40.0 \leq vd\_PL$ $0.005 \leq \theta gF\_PL - 0.6438 + 0.001682 \times vd\_PL$ $0.1 \leq f\_PL/fT \leq 2.0$ $0.9 \leq LPT/fT \leq 5.0$ $1.0 \leq LPW/fW \leq 2.2$ where vd_NL is an Abbe number of the negative lens for d-line, θgF_NL is a partial dispersion ratio of the negative lens for g-line and F-line, vd_PL is an Abbe number of the positive lens for the d-line, θgF_PL is a partial dispersion ratio of the positive lens for the g-line and the F-lines, f_PL is a focal length of the positive lens, fT is a focal length at a telephoto end of the zoom lens, LPT is a distance from the positive lens to an image plane at the telephoto end, D1 is a thickness of the first lens unit on an optical axis, f1 is a focal length of the first lens unit, fW is a focal length of the zoom lens at a wide-angle end, and LPW is a distance from the positive lens of the zoom lens at the wide-angle end to the image plane.

* * * * *